March 21, 1967 A. B. FOSDICK 3,310,777
CONTROLLABLE RECTIFIER RECEIVER RESPONSIVE TO PLURAL SIGNAL CONDITIONS
Filed Jan. 3, 1963
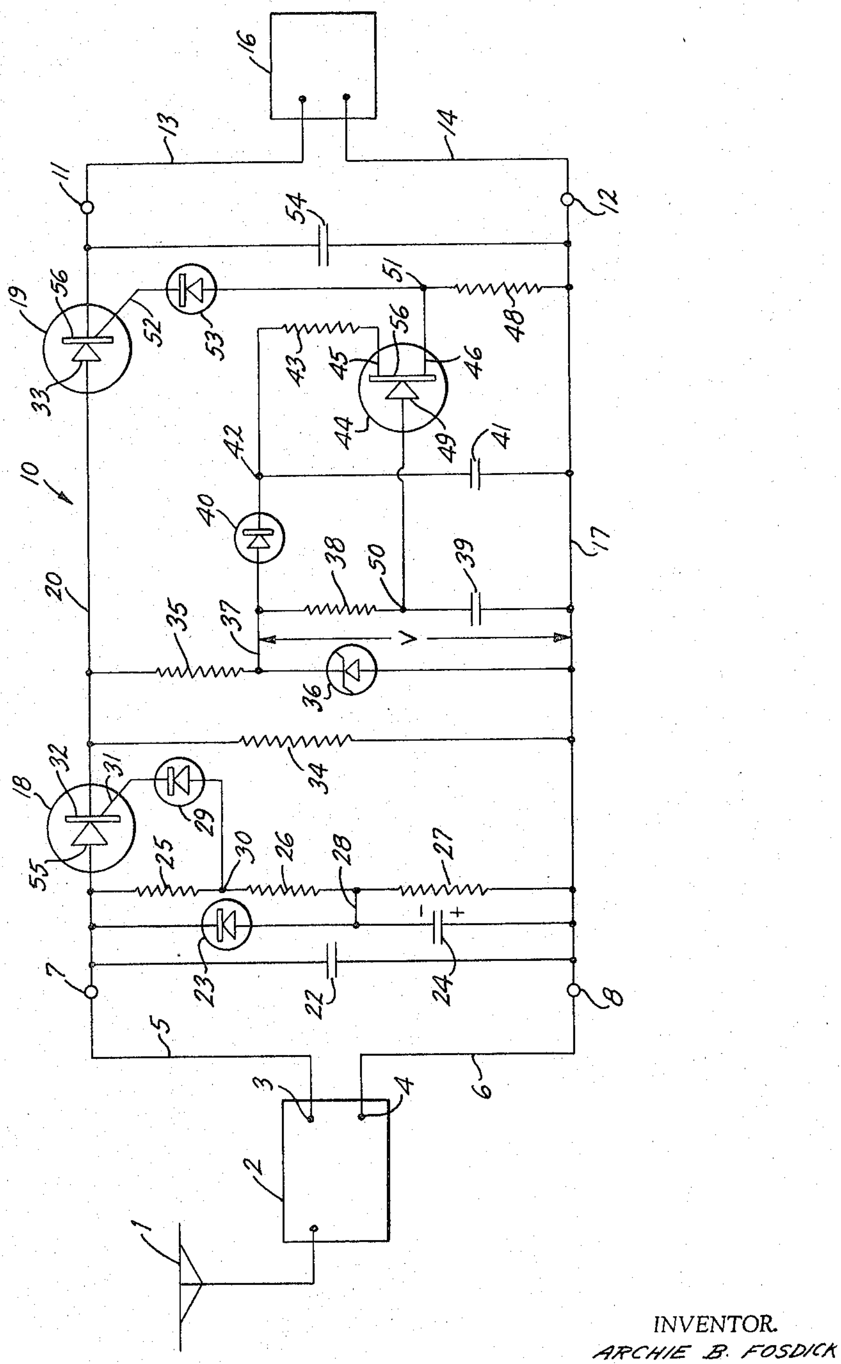
INVENTOR.
ARCHIE B. FOSDICK
BY
Curtis, Morris & Safford
ATTORNEYS 3,310,777

CONTROLLABLE RECTIFIER RECEIVER RESPONSIVE TO PLURAL SIGNAL CONDITIONS

Archie B. Fosdick, Levittown, Pa., assignor to Thiokol Chemical Corporation, Bristol, Pa., a corporation of Delaware Filed Jan. 3, 1963, Ser. No. 249,293
7 Claims. (Cl. 340—147)

The present invention relates to a selective control circuit which is adapted to respond to a command signal of predetermined characteristics but which definitely does not respond to other signals of different characteristics. More particularly, the present invention relates to a selective control circuit for ordnance initiation devices which selectively distinguishes from amongst a variety of electrical signals one particular signal having a predetermined amplitude, duration, and waveform and which utilizes this one signal for actuating the ordnance device while rejecting all of the others.

In the initiation, that is, detonation, of any of several kinds of ordnance devices commonly known as detonators or squibs by means of electrical control signals there is a stringent requirement that the ordnance device cannot be triggered off by spurious or extraneous signals, and conversely, for utility it is necessary that the device definitely be actuated when the desired control signal has been received.

Among the many advantages of the selective control circuit for ordnance initiation devices as described herein as illustrative of the present invention are those resulting from the fact that this circuit rejects as unsuitable and excludes all extraneous signals which might for any reason whatever appear at the input to the control circuit and yet this circuit responds to a control signal having the prerequisite characteristics. Moreover, this circuit is extremely reliable in operation and avoids the complexity of many prior control circuits. Only a few electrical components are included in this circuit, and nevertheless this circuit is highly selective in its positively dependable refusal to respond to spurious signals.

The various features, objects and advantages of the present invention will become more fully understood from a consideration of the following detailed disclosure and explanation in conjunction with the accompanying drawing. This drawing shows a schematic circuit diagram of an embodiment of the invention in a selective control circuit in which the signal selection basis is (a) proper polarity, (b) minimum amplitude, and (c) minimum time duration, i.e. minimum wave length.

As shown in the drawing an antenna 1 is adapted to receive a control signal and is connected to a suitable radio receiver 2 having a pair of output terminals 3 and 4. The terminal 4 serves as a reference terminal with respect to the voltage appearing at the terminal 3. These radio terminals 3 and 4 are respectively connected by input circuit means 5 and 6 with the input terminals 7 and 8 of a selective control circuit, generally indicated at 10, and having output terminals 11 and 12 which are respectively connected by output circuit means 13 and 14 with an ordnance device 16. The ordnance device 16 is initiated by an electrical signal from the control circuit 10 and is commonly known as a detonator or squib.

As will be understood there are many different types of radio receivers or other types of input circuits which can be connected by the leads 5 and 6 with the control circuit 10 and similarly there are many different types of electrically actuated ordnance devices 16 which can be connected by a pair of leads 13 and 14 with the output control terminals 11 and 12.

In the control circuit 10 there is a reference line 17, also called a common return connection, which interconnects the input terminal 8 and the output terminal 12 so that, in effect, the input and output terminals 8 and 12 are common to both the input and output portions of the circuit 10. In serial relationship between the input terminal 7 and the output terminal 11 are a first and a second silicon control rectifier 18 and 19 (hereinafter each is called "SCR") with a connection line 20 extending therebetween. This serial connection provides a forward current path from plus to minus in the sequence anode-cathode and anode-cathode.

To remove stray audio- and radio-frequency signals from the input terminals 7 and 8, there is a low-impedance by-pass capacitor 22 shunted across between these terminals. This capacitor 22 has an electrical capacitance to provide a low-impedance path for these frequencies, for example such as a capacitance in the range from 0.005 to 0.1 microfarad.

Also shunted across the input terminals 7 and 8 are two electrical meshes. The first of these includes a semiconductor diode 23 which is serially connected with an electrolytic capacitor 24. This capacitor 24 is of the electrolytic type and has a capacitance value of the order of hundreds or thousands of times the capacitance of the by-pass capacitor 22 for reasons as explained further below, for example such as a capacitance of 10 microfarads.

The second input mesh includes three resistors 25, 26 and 27 which are serially connected. The two resistors 25 and 26 have equal resistance values, for example such as 3.3K (kilohms), but the third resistor 27 has a much higher resistance value, for example such as 100K. These two input meshes have a cross connection at 28 so that the electrolytic capacitor 24 and the resistor 27 are actually connected in parallel.

The diode 23 is reverse-connected so that when the input terminal is positive with respect to the reference line 17, the diode 23 is non-conducting. Another semiconductor diode 29 serves as a forward conductor between the juncture 30 which lies between resistors 25 and 26, and the trigger electrode 31 of the SCR 18. Thus, when the input terminal 7 is made positive with respect to the reference line 17, the diode 29 provides a low-resistance path between the juncture 30 and the trigger electrode 31 of the SCR 18.

The line 20 connects the cathode 32 of the SCR 18 and the anode 33 of the second SCR 19, and shunted between this line 20 and the reference line 17 are two meshes. The first of these includes a single resistor 34 serving as a load resistor for the first SCR 18. The second mesh includes a supply resistor 35 for supplying current to a semiconductor zener diode 36, and this zener diode, when it is in operation, establishes a stable voltage V between the connection 37 and the line 17. In this example, the inverse stabilizing voltage V across the zener diode 36 during operation is 22 volts. A resistor 38 and a capacitor 39 are serially connected across the zener diode 36 thus extending from the connection 37 to the reference line 17. This resistor 38 and the capacitor 39 have values of resistance R and capacitance C providing a desired time-constant (RC) for establishing the criterion for rejecting signals which are shorter than the requisite minimum length. In this example the minimum length is set at 12 milliseconds, and the time-constant RC has this value, for example, the resistor 38 has a value of 12K and the capacitor 39 has a capacitance of 1 microfarad so that their product RC is a time-constant of 12 milliseconds.

Another mesh includes a semiconductor diode 40 and a capacitor 41 which are serially connected, and this mesh is imposed between the juncture 37 and the reference line 17. The diode 40 is forward connected for conduction whenever the juncture 37 is positive with respect to the reference line 17. In this example, a capacitance of 2.2 microfarads is found to be a suitable electrical value for the capacitor 41.

Between the juncture 42 and the reference line 17 there is a mesh comprising a resistor 43 and a semiconductor unijunction 44 having a base-2 electrode 45 and a base-1 electrode 46 connected to a resistor 48. The emitter electrode 49 in the unijunction 44 is connected to the juncture 50 as shown. In this example, a suitable electrical value for the resistor 43 is 0.22K, and a suitable electrical value for resistor 48 is 0.051K. These two resistors 43 and 48 together with the two base electrodes 45 and 46 of the unijunction form a voltage divider network. In view of the fact that the resistor 48 has less than one-fourth of the resistance value of the resistor 43 and in view of the high impedance of the unijunction when it is not in its conducting state there is very little voltage applied to the point 51 until the unijunction has been thrown into its conducting state.

Between the juncture 51 and the trigger electrode 52 in the SCR 19 there is connected a semiconductor diode 53. This diode 53 is forward connected so that a low-resistance path is provided whenever the juncture 51 is sufficiently positive with respect to the trigger electrode 52. A capacitor 54 is connected as a shunt for medium- and high-frequency currents across the output terminals 11 and 12 so as to assure that no undesired signals are induced in the output connections 13 and 14 and thus prevent accidental triggering of the device 16.

In operation a command signal is received in the input connections 5 and 6. As shown this command signal may arrive by radio and it may arrive by direct connection to the input connection 5 and 6, depending upon the input circuit arrangement as will be understood.

In this example the selective control circuit 10 is provided to accept a control signal at the input terminals 7 and 8 having the following characteristics: (a) polarity, positive on the terminal 7 with respect to the common reference line 17, (b) amplitude, 26 to 28 volts D.C., and (c) duration of signal, at least 12 milliseconds continuous. Upon the application of such a control signal, the by-pass capacitor 22 is rapidly charged to the input voltage. The diode 23 has reverse bias so that it is non-conducting. The electrolytic capacitor 24 is reverse connected so that it has high leakage current passing therethrough thus effectively short-circuiting the resistor 27. This high leakage current is one of the reasons for using an electrolytic capacitor 24 of large capacitance. Consequently, in effect, the full magnitude of the input signal voltage is imposed across the two resistors 25 and 26. Half of the applied signal voltage appears at the juncture 30, and by conduction through the diode 29 is thence imposed on the trigger electrode 31 in the SCR 18. The full input voltage is simultaneously imposed on the anode 55 of the SCR 18 providing a favorable condition for placing this SCR in its conducting state, whereupon conduction through this SCR is initiated.

As a result of the start of conduction through the SCR 18 from its anode 55 to cathode 32, the input signal voltage now appears on the line 20 and current flows in the load resistor 34. Current also flows in the resistor 35, the diode 40, and this diode current charges the capacitor 41 in a very short time. As the voltage rises rapidly across the zener diode 36, the critical inverse stabilizing voltage V for the zener diode holds and no further increase is permitted, for example a voltage V of 22 volts.

Current now flows through the resistor 38 so as to charge the capacitor 39 and thus to place a forward bias on the emitter 49 of the unijunction 44. Current also flows in the resistor 43 through the double base 56 and through the other resistor 48; however, the voltage at the juncture 51 initially is not sufficient to override the barrier potential of the diode 53 and so the second SCR 19 remains in its non-conducting state.

As the voltage at the juncture 50 rises exponentially toward the fixed voltage V, the rate of rise is determined by the time-constant discussed above, and the emitter potential on the unijunction 44 rises with it. At a critical potential the resistance of the unijunction 44 suddenly falls so that the now higher voltage at the juncture 50 is applied through the diode 53 onto the trigger electrode 52 of the SCR 19 causing initiation of conduction through this SCR from its anode 33 to its cathode 56, whereupon the output terminal 11 is effectively coupled to the input terminal 7. In a matter of a few microseconds the capacitor 54 is charged to the signal potential on the input terminal 7. The initiating device 16 is then tripped and the explosive material in the ordnance device is thereby set off.

The initiation of conduction through the second SCR 19 is timed by the RC time constant of the resistance-capacitance circuit 38, 39. If the time duration of the control signal is less than a certain critical value, which in this example is 12 milliseconds, then the second SCR 19 is not thrown into conduction. If the signal on the input terminals had been of the opposite polarity, that is, if terminal 7 had been negative with respect to terminal 8, then the first SCR 18 is not thrown into conduction and of course, neither is the second SCR 19 and the initiating circuit 16 is not tripped.

If an alternating potential is applied at the input terminals 7 and 8 having a frequency of 25 cycles per second or higher, a negative D.C. bias is built up as a stored charge on the electrolytic capacitor 24 by halfwave rectification through the diode 23, and this negative bias inhibits the initiation of conduction of the SCR 18 and the SCR 19 and so the initiating device 16 is not tripped. Thus, it is clear that the input control signal must have the characteristics (a), (b) and (c) as noted above in order to actuate the two SCR's and thereby to trip the following initiating device 16.

From the foregoing it will be understood that the selective control circuit described herein as an embodiment of the present invention is well suited to provide the advantages set forth, and since many possible uses may be made of the various features of this invention and as the apparatus herein described may be varied in various parts, all without departing from the scope of the invention, it is to be understood that all matter hereinbefore set forth or shown in the accompanying drawing is to be interpreted as illustrative and not in a limiting sense and that in certain instances, some of the features of the invention may be used without a corresponding use of other features, all without departing from the scope of the invention.

What is claimed is:

1. A selective control circuit having an input terminal and an output terminal, said selective control circuit preventing the passage of any electrical signal from said input to said output terminal in the absence of a command signal of predetermined polarity and of predetermined minimum duration, said selective control circuit comprising said input and output terminals and a common reference line, a first and a second controllable rectifier connected in serial relationship between said input and output terminal and both arranged in the same conducting direction and each having a control electrode for initiating conduction therethrough, an input circuit for rejecting signals of the opposite polarity and for rejecting alternating current signals above a predetermined frequency connected between said input terminal and said reference line including a diode in series with an electrolytic capacitor shunted between said input terminal and said reference line, said diode blocking conduction of signals of said predetermined polarity and said electrolytic capacitor providing a low impedance conduction path for signals of said predetermined polarity, first resistance means connected across said diode and second resistance means connected across said electrolytic capacitor, an intermediate point in said first resistance means being connected to the trigger electrode of said first controllable rectifier device, whereby a signal of said predetermined polarity and of frequency below said predetermined frequency will initiate conduction through said first controllable rectifier, and a time-control circuit connected from the output of said first controllable rectifier to the control electrode of the second controllable rectifier for rejecting signals of duration below said predetermined minimum including a first resistor and voltage regulation means in series between the output of said first controllable rectifier and said reference line, a second resistor in series with a capacitor across said voltage regulation means, and circuit means connecting said capacitor to the control electrode of said second controllable rectifier for initiating conduction through said second controllable rectifier and the output terminal in the presence of a command signal exceeding said predetermined minimum duration.

2. A selective control circuit having an input terminal and an output terminal and for preventing the passage of any electrical signal from said input to said output terminal in the absence of a command signal having characteristics of (a) property polarity, (b) amplitude exceeding a minimum amplitude, and (c) duration exceeding a minimum time duration, and said selective control circuit (d) rejecting alternating-current signals exceeding a minimum frequency, said selective control circuit comprising said input and output terminals and a common reference line, first and second controllable rectifiers having the anode-cathode conduction paths thereof connected in serial relationship between said input and output terminal and both arranged in the same conducting direction and each having a control electrode for initiating conduction therethrough, an input circuit for rejecting signals of improper polarity and for rejecting alternating current signals exceeding a predetermined minimum frequency connected between said input terminal and said reference line including a diode in series with an electrolytic capacitor shunted between said input terminal and said reference line, said diode blocking conduction of signals of the proper polarity and said electrolytic capacitor providing a low impedance conduction path for signals of said proper polarity, first resistance means connected across said diode and second resistance means connected across said electrolytic capacitor, an intermediate point in said first resistance means being connected to the trigger electrode of said first controllable rectifier, whereby a signal of said proper polarity and of frequency below said predetermined minimum will initiate conduction through said first controllable rectifier, and a time-control and amplitude responsive circuit connected from the output of said first controllable rectifier to the control electrode of the second controllable rectifier for rejecting signals of duration below a predetermined minimum time and for rejecting signals of amplitude below said predetermined minimum amplitude including a first resistor and voltage regulation means in series between the output of said first controllable rectifier and said reference line, a second resistor in series with a capacitor across said voltage regulation means, and circuit means connecting said capacitor to the control electrode of said second controllable rectifier for initiating conduction through said second controllable rectifier and the output terminal in the presence of a command signal having said characteristics.

3. A selective control circuit having an input terminal and an output terminal, said selective control circuit preventing the passage of any electrical signal from said input to said output terminal in the absence of a command signal of characteristics: (a) proper polarity, (b) exceeding a predetermined minimum amplitude, and (c) exceeding a predetermined minimum time duration, said selective control circuit comprising said input and output terminals and a common reference line, a first and a second controllable rectifier connected in serial relationship between said input and output terminal and both arranged in the same conducting direction and each having a control electrode for initiating conduction therethrough, an input circuit for rejecting signals of improper polarity and for rejecting alternating current signals above a predetermined frequency connected between said input terminal and said reference line including a diode in series with an electrolytic capacitor shunted between said input terminal and said reference line, said diode blocking conduction of signals of said proper polarity and said electrolytic capacitor providing a low impedance conduction path for signals of said proper polarity, first resistance means connected across said diode and second resistance means connected across said electrolytic capacitor, an intermediate point in said first resistance means being connected to the trigger electrode of said first controllable rectifier, whereby a signal of said proper polarity and of frequency below said predetermined frequency will initiate conduction through said first controllable rectifier, and a duration and amplitude responsive circuit connected from the output of said first controllable rectifier to the control electrode of the second controllable rectifier for rejecting signals of duration and amplitude below said respective predetermined minima including a first resistor and voltage regulation means in series between the output of said first controllable rectifier and said reference line, a second resistor in series with a capacitor across said voltage regulation means for providing a known time-constant, and a unijunction having its emitter connected to said time-constant capacitor, a second diode in series with a second capacitor of substantial capacitance across said voltage regulation means, a fourth resistor, the base electrodes of said unijunction and a fifth resistor in series across said second capacitor, said fifth resistor being connected to the control electrode of said second controllable rectifier.

4. In a selective control circuit for responding to an electrical command signal of predetermined characteristics while avoiding response to other electrical signals, said control circuit including first and second input terminals arranged for connection to a source of command signals and first and second output terminals arranged for connection to a device to be controlled, the combination of a controllable rectifier having an anode-cathode conduction path in circuit between said first input and first output terminals and having a trigger electrode for initiating conduction in said anode-cathode path, a common return connection between said second input and output terminals, input circuit means for rejecting alternating-current signals above a predetermined frequency and for rejecting signals of undesired polarity comprising a diode in serial relationship with an electrolytic capacitor between said first and second input terminals, a first and a second resistor in series shunted across said diode, said first and second resistors having commensurate resistance values, and a third resistor shunted across said electrolytic capacitor, said third resistor having a resistance value larger than either said first or second resistor, said diode being poled for conducting signals of said undesired polarity and said electrolytic capacitor being poled for conducting signals of the desired polarity, and circuit means connecting an intermediate point on said first resistance means to said trigger electrode.

5. In a selective control circuit for responding to an electrical command signal of predetermined characteristics while avoiding response to other electrical signals, said control circuit including first and second input terminals for connection to a source of command signals and first and second output terminals for connection to a device to be controlled, the combination of a controllable rectifier having an anode-cathode conduction path in circuit between said first input and first output terminals and having a trigger electrode for initiating conduction in said anode-cathode path, a common return between said second input and output terminals, input circuit means for rejecting alternating-current signals above a predetermined frequency and for rejecting signals of undesired polarity comprising a diode in serial relationship with an electrolytic capacitor between said first and second input terminals, first resistance means shunting said diode, and second resistance means shunting said electrolytic capacitor, said diode being poled for conducting signals of said undesired polarity and said electrolytic capacitor being poled for conducting signals of the desired polarity, and circuit means connecting an intermediate point on said first resistance means to said trigger electrode.

6. A selective control circuit for ordnance initiation devices having an input for connection to a source of command signals and having an output for connection to an ordnance initiation device, said control circuit being adapted to deliver an output signal to said ordnance initiation device only in response to its receipt of a command signal having the characteristics of (a) proper polarity, (b) amplitude exceeding a predetermined minimum amplitude, (c) duration exceeding a predetermined minimum time duration, and (d) no alternating current component with a frequency exceeding a predetermined minimum value, said control circuit also having a plurality of controllable rectifiers in serial relationship between said input and output and each having a trigger electrode for initiating conduction therethrough, first circuit means connected to the trigger electrode of one of said controllable rectifiers for preventing conduction therethrough in the absence of a signal of proper polarity and of frequency below said minimum frequency and second circuit means connected to the trigger electrode of another of said controllable rectifiers for preventing conduction therethrough in the absence of a signal of amplitude and duration exceeding said minimum amplitude and minimum duration.

7. In a selective control circuit for responding to an electrical command signal of predetermined characteristics while avoiding response to other electrical signals, said control circuit including first and second input terminals for connection to a source of command signals and first and second output terminals for connection to a device to be controlled, the combination of a controllable rectifier having an anode-cathode conduction path in circuit between said first input and first output terminals and having a trigger electrode for initiating conduction in said anode-cathode path, a common return between said second input and output terminals, and circuit means for rejecting signals having an amplitude below a predetermined minimum and signals of duration less than a predetermined minimum, said circuit means including a first resistor and voltage stabilization means in series between the input to said controllable rectifier and said common return, a second resistor and a capacitor in series across said voltage stabilization means, and second circuit means connecting the juncture of said second resistor and capacitor to the trigger electrode of said controllable rectifier.

References Cited by the Examiner

UNITED STATES PATENTS

| | | | |
|---|---|---|---|
| 2,512,639 | 6/1950 | Gohorel | 340—147 |
| 2,677,122 | 4/1954 | Gardner | 340—147 |
| 2,942,237 | 6/1960 | Quioque | 340—147 X |
| 3,085,165 | 4/1963 | Schaffert | 307—88.5 |
| 3,111,008 | 11/1963 | Nelson | 307—88.5 |
| 3,124,793 | 3/1964 | Foster | 307—88.5 |

NEIL C. READ, *Primary Examiner.*

H. I. PITTS, *Assistant Examiner.*